US006714843B2

(12) United States Patent
Agne

(10) Patent No.: US 6,714,843 B2
(45) Date of Patent: Mar. 30, 2004

(54) CLOSED-LOOP CONTROL METHOD FOR OPERATION OF INDIVIDUALLY DRIVEN ROTATING MACHINE ELEMENTS

(75) Inventor: Werner Agne, Röthenbach (DE)

(73) Assignee: Siemens Aktiengesellschaft (DE)

( * ) Notice: Subject to any disclaimer, the term of this patent is extended or adjusted under 35 U.S.C. 154(b) by 112 days.

(21) Appl. No.: 09/943,460

(22) Filed: Aug. 30, 2001

(65) Prior Publication Data

US 2002/0174789 A1 Nov. 28, 2002

(30) Foreign Application Priority Data

May 25, 2001 (DE) ........................................ 101 25 609

(51) Int. Cl.[7] ................................................ G05D 13/00

(52) U.S. Cl. ........................ 700/302; 700/156; 101/485

(58) Field of Search .............................. 700/54, 56, 57, 700/62, 126, 127, 128, 148, 150, 156, 302, 61, 275; 101/485

(56) References Cited

U.S. PATENT DOCUMENTS 4,126,027 A * 11/1978 Smith et al. ................ 700/156
4,625,536 A * 12/1986 Morooka .................... 700/151
5,181,408 A * 1/1993 Yeh et al. ................... 700/302
5,606,509 A * 2/1997 Denz et al. ................. 700/143
6,137,592 A * 10/2000 Arquilevich et al. ......... 358/1.8
6,428,224 B1 * 8/2002 Askren et al. .............. 400/582

FOREIGN PATENT DOCUMENTS

| | | | |
|---|---|---|---|
| DE | 4322744 | | 1/1995 |
| DE | 19623223 | | 6/1996 |
| DE | 19723059 | | 6/1997 |
| EP | 0001565 | | 9/1978 |
| WO | WO 97/11848 | * | 4/1997 |

* cited by examiner

*Primary Examiner*—Leo Picard
*Assistant Examiner*—Paul Rodriguez
(74) *Attorney, Agent, or Firm*—Baker Botts LLP

(57) ABSTRACT

The invention relates to a closed-loop control method for operation of individually driven rotating machine elements (M1, M2) with angle position control, which elements are coupled with a force fit or via a common load (L). In this case, parameters (UP) that describe the circumference of the driven corresponding machine elements (M1, M2) are supplied as a correction variable in the form of an angle position error (WA) to the input of the angle position regulator (WR). These may be diameters or radii of machine elements (M1, M2) which are involved, as well as a diameter and at least one diameter difference, or at least one radius and at least one radius difference.

6 Claims, 2 Drawing Sheets

Figure 1:
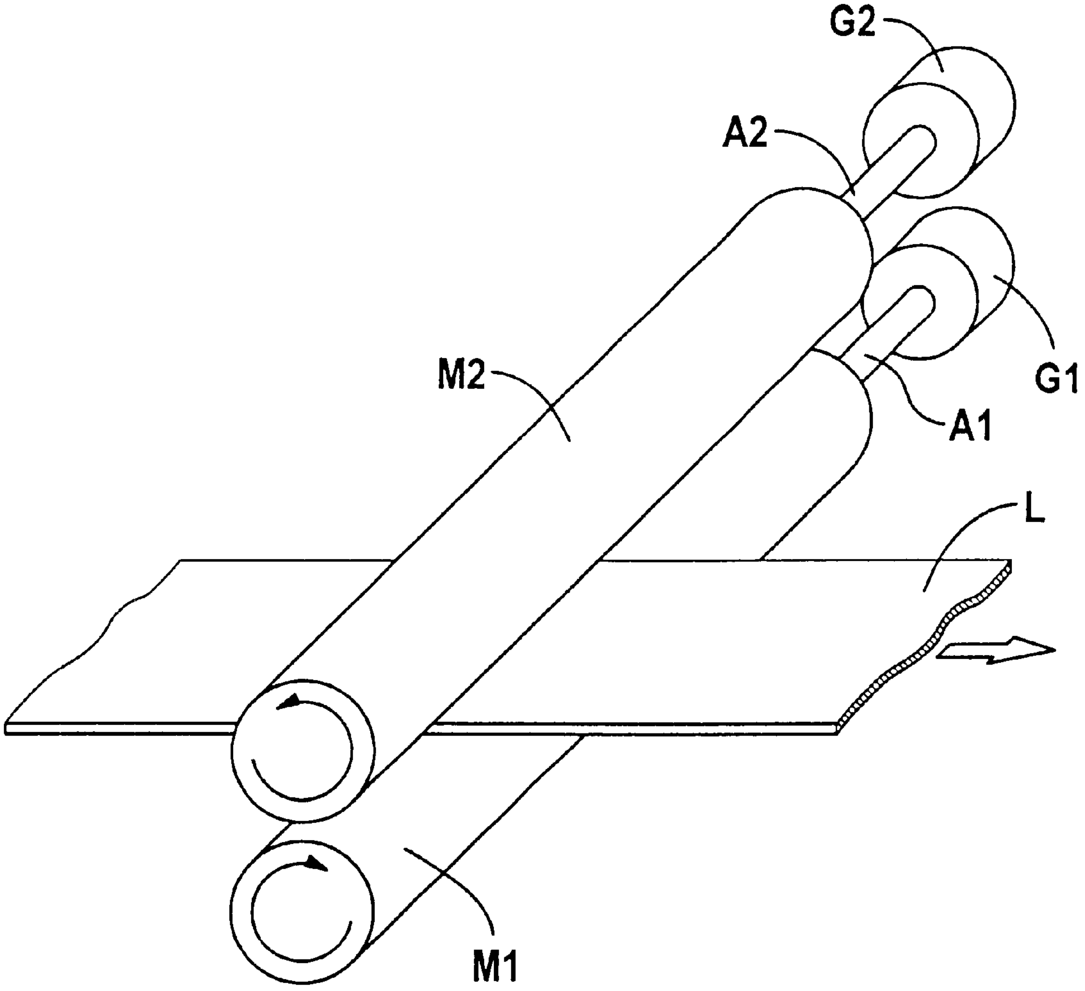

CLOSED-LOOP CONTROL METHOD FOR OPERATION OF INDIVIDUALLY DRIVEN ROTATING MACHINE ELEMENTS

BACKGROUND OF THE INVENTION

The invention relates to a closed-loop control method for operation of individually driven rotating machine elements with angle position control, which elements are coupled with a force fit or via a common load.

International application WO 97/11848 discloses a drive concept in which information which ensures synchronous angular running of the drives during rotation is transferred exclusively via a synchronization bus. Synchronous angular running of printing machines is required in order to achieve high production quality for the printed media.

If individually driven machine elements, which are mechanically coupled via a force fit or via a common load, are operated with angular position control, then different path speeds at the coupling point, path or medium lead to the occurrence of slip. The respective angular position control associated with the machine elements attempts to convert the preset values on the basis of the set value. In this case, it is possible for two drive regulators to produce control actions in opposite senses, that is to say one drive regulator attempts to drive, while another one attempts to brake. In this case, depending on the power relationships, slip occurs after the tear-free moment, during which slip the actual values of the machine elements which are involved change suddenly in the direction of the set values.

The mechanical loading of the drives and the occurrence of slip are associated with increased power requirements for the converters. This is normally taken into account in the design of the converter or drive itself.

The object of the invention is to eliminate or to minimize any position error for individually driven rotating machine elements which are operated using angular position control.

According to the invention, this object is achieved in that parameters which describe the circumference of the driven corresponding machine elements are supplied as a correction variable in the form of an angle position error to the input of the angle position regulator. In this case, geometric variables relating to rotating machine elements are included in the respectively involved drive regulators, and minimize the slip error. Even minor manufacturing tolerances in the rotating machine elements can be taken into account in a drive regulator by means of this method, thus improving the control accuracy. More accurate positioning is thus possible, as is required, for example, for machine tools and printing machines.

A further advantage of the described circumferential correction is that the power consumed by the converters involved is reduced considerably. The energy that was previously required for loading machine elements or for the occurrence of slip is considerably reduced, or is no longer required. In addition, the converters can be designed using the method according to the invention so that they require less energy.

A first advantageous embodiment of the invention is characterized in that diameters or radii of machine elements which are involved are used as paramters to describe the circumference. This allows easily accessible, measurable parameters of a rotating machine element to be configured in an advantageous manner in the respective drive regulators.

A further advantageous embodiment of the invention is characterized in that at least one diameter and at least one diameter difference, or at least one radius and at least one radius difference, are used as the parameters which describe the circumference. This method makes it easy to use measurement variables which can be determined from a relative measurement. For example, using this method, it is possible to use a main diameter or radius which is referred to in the control system by means of error details.

An advantageous device for operation of individually driven rotating machine elements using angle position control, which are coupled with a force fit or via a common load, is characterized in that parameters which describe the circumference of the driven corresponding machine elements can be supplied as a correction variable in the form of an angle position error to the input of the angle position regulator. This device advantageously makes it possible to eliminate or minimize a slip error in rotating machine elements or a driven load.

A control method as claimed in claims 1 to 3 and/or a device as claimed in claim 4 can advantageously be used in printing machines. The use of the closed-loop control method according to the invention and/or of the device according to the invention in a specific embodiment of production machines, namely printing machines, results in advantages. A higher-quality printed product can be produced by eliminating or minimizing the slip error.

A drive system such as this allows extremely high synchronization accuracies to be achieved between individually driven machine elements which are involved. Furthermore, electronically synchronized synchronization shafts, which are provided with high synchronization characteristics, and electronic transmissions can also be produced in a simple manner. Multi-color printing by rotary printing machines with individually driven printing cylinders, in particular, places particularly stringent requirements on the production accuracy of a printing machine.

Figure 2:
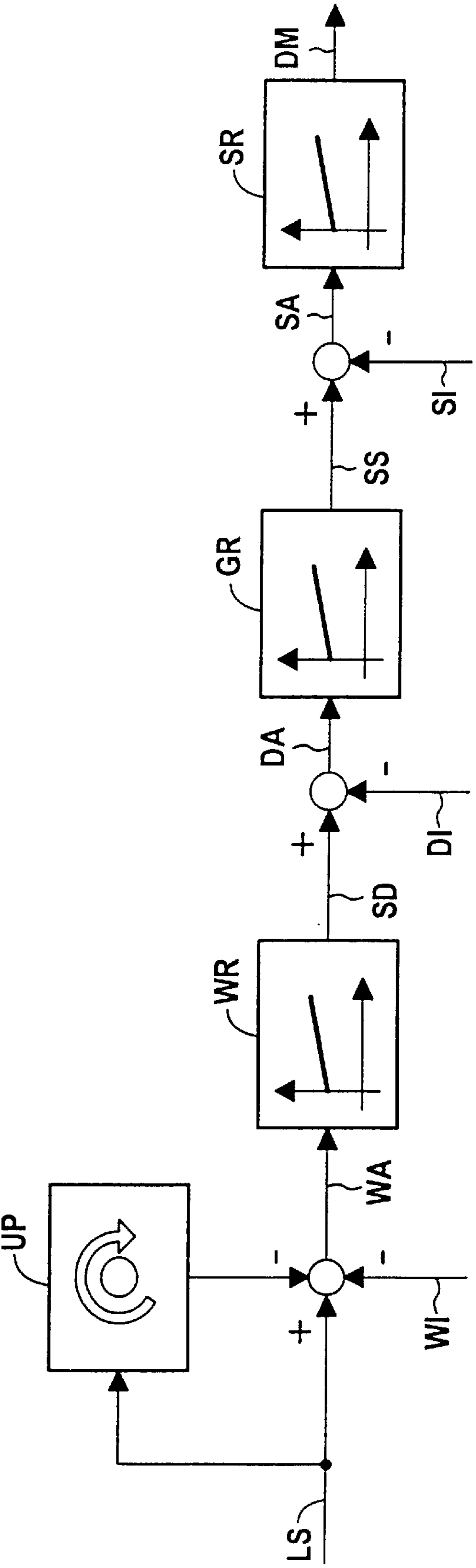

An exemplary embodiment of the invention will be explained in more detail in the following text and is illustrated in the drawing, in which:

FIG. 1 shows two rolls of a machine, which are driven individually and are coupled via a force fit and via a common load; and FIG. 2 shows a closed-loop control system block diagram for an individually driven rotating machine element with parameters which describe the circumference as a correction variable for the angular position error.

The illustration in FIG. 1 shows, in the form of a partial illustration, individually driven rotating machine elements which are coupled via a force fit and via a common load. For the sake of clarity, the drives of the rotating machine elements M1, M2 are not shown. In the illustration in FIG. 1, the machine elements M1 and M2 are arranged one above the other, and are coupled via a force fit and a common load L.

The actual value rotation sensors G1 and G2 are located on the shafts A1, A2. Their information is used by the drive regulator to determine the actual value of the angular position. Normally, the individual drives are equipped with high-precision actual value sensors G1, G2, whose signal resolutions are more than 1,000,000 sections per 360° of revolution. The actual value rotation sensors G1, G2 are attached to the load which is driven by the motor. By way of example, in printing machines, it is advantageous to fit the actual value rotation sensors G1, G2 at the end of the driven printing cylinder at which there is no torque.

If the machine elements M1, M2 have a different circumference, then the contact points between the machine elements M1, M2 and the load L have a different path speed. This leads to slip on the load L and/or to an undesirable drive response, in such a manner that one drive attempts to drive, while a further attempts to brake the system. Energy has to be consumed for this load on the machine elements M1, M2.

Even very minor discrepancies between the circumferences of the machine elements M1, M2 involved from the known nominal circumference lead to the occurrence of slip. The invention allows even minor manufacturing tolerances in the drive regulator to be taken into account, and leads to the drive regulator having a better response.

Wheels, rolls or gearwheels, for example, may be regarded as rotating individually driven machine elements M1, M2.

The illustration in FIG. 2 shows a closed-loop control system block diagram for an individually driven rotating machine element M1, M2 with parameters UP, which describe the circumference, as a correction variable for the angular position error WA. In this case, a position set value LS is preset by an open-loop or closed-loop control system at a higher level, which is not illustrated for the sake of clarity. The angular position actual value WI from a rotation sensor G1, G2 is subtracted from the set position value LS. This is then supplied to a control block, namely the circumference parameter UP, whose result is likewise subtracted from the set position value LS.

The following analysis is based on an exemplary embodiment as illustrated in FIG. 1. In this case, the circumference of the machine element M1 is larger than that of the machine element M2 by ΔU. This situation is stored with descriptive parameters in the block diagram UP (circumference parameter).

In order to achieve path synchronicity on the load L, the angular velocity of the shaft A1 must be reduced in order that no slip, or minimized slip, occurs on the load L. A value which is dependent on the difference in the circumferences ΔU is thus subtracted from the angular position actual value WI, and leads to a resultant angular position error WA. This is an input parameter to an angular position regulator WR, which determines a set rotation speed SD. A rotation speed error DA is obtained by subtracting the actual rotation speed value DI from the set rotation speed SD. The rotation speed error DA is supplied to a speed regulator GR which, for this purpose, outputs a set current SS. An actual current value SI for the drive is subtracted from this set current SS, so that a current regulator SR can use the resultant current error SA to determine a torque DM.

The torque DM is transmitted to an associated drive converter. The actual current value information SI is often transmitted by the converter itself, and in many cases is determined within the equipment, as the converter output current. The actual rotation speed value DI is supplied in the form of the time derivative of the angular position actual value WI to the drive regulator. This derivative can be produced by sensor evaluation, but it is also feasible to carry out differentiation in the drive regulator.

In the illustration in FIG. 2, all the data paths are shown as links with arrows. When data items are added or subtracted, then this is represented by a plus sign (+) or a minus sign (−) in the vicinity of a circle, at which the arrow heads from parameters to be added or to be subtracted meet. All the block diagrams are in the form of rectangles. The closed-loop control system block diagrams WR, GR and SR have a graph shown symbolically inside them. The block diagram for circumference parameters UP has a circle inside it, around part of the circumference of which a double arrow link is arranged.

In summary, it should be mentioned that distance errors arising from a different circumference need not be compensated for on the load, but are corrected directly using circumference parameters UP before being input to the drive regulator. For example, in printing machines, slip of a paper web can advantageously be eliminated or minimized, thus avoiding the paper web tearing in unfavorable circumstances.

Furthermore, it should be mentioned that the use of the method according to the invention is associated with the converters which are involved consuming less energy. This is due to the reduction in the mechanical loads on machine elements and/or the avoidance of slip.

I claim:

1. A control method for operating individually actuated rotating machine elements having an angular position controller, and wherein the elements are coupled via a force fit and a common load, and contact points between the machine elements and the load having a different path speed comprising supplying parameters to the angular position controller, said parameters describing a circumference of the actuated corresponding machine element in the form of a correction variable of a deviation in angular position inorder to minimize slip of the load.

2. The method according to claim 1, further comprising using diameters or radii of machine elements as parameters to describe the perimeter.

3. The method according to claim 1, wherein at least one diameter and at least one diameter difference, or at least one radius and at least one radius difference, as the parameters which describe the perimeter.

4. A device for operating individually activated rotating machine elements having an angular position controller, and wherein the elements are coupled via a force fit and a common load, further wherein contact points between the machine elements and the load have a different path speed, said device comprising means by which parameters describing a circumference of the actuated corresponding machine elements are supplied to the angular position controller in the form of a correction variable of an a deviation in angular position in order to minimize slip of the load.

5. The method according to claim 1, wherein the rotating machine elements are associated with a printing machine.

6. A device according to claim 4, wherein said device is a printing machine.

* * * * *